United States Patent
Wasserman et al.

(10) Patent No.: US 6,910,136 B1
(45) Date of Patent: Jun. 21, 2005

(54) VERIFICATION OF SERVER AUTHORIZATION TO PROVIDE NETWORK RESOURCES

(75) Inventors: Steven C. Wasserman, Mountain View, CA (US); Toby E. Farrand, Los Altos, CA (US); Donald M. Gray, III, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 09/978,536

(22) Filed: Oct. 16, 2001

Related U.S. Application Data

(63) Continuation of application No. 09/270,362, filed on Mar. 16, 1999, now Pat. No. 6,304,969.

(51) Int. Cl.[7] .......................... G06F 11/30; G06F 12/14; H04L 9/00; H04L 9/32
(52) U.S. Cl. ...................................... 713/201; 713/169
(58) Field of Search ................................. 713/201, 200, 713/202, 169

(56) References Cited

U.S. PATENT DOCUMENTS

| | | | |
|---|---|---|---|
| 4,799,061 A | 1/1989 | Abraham et al. | 340/825.34 |
| 5,113,499 A | 5/1992 | Ankney et al. | 395/325 |
| 5,146,068 A | 9/1992 | Ugawa et al. | 235/441 |
| 5,317,637 A | 5/1994 | Pichlmaier et al. | 380/25 |
| 5,434,918 A | 7/1995 | Kung et al. | 380/25 |
| 5,510,777 A | 4/1996 | Pilc et al. | 340/825.31 |
| 5,671,281 A | 9/1997 | Campbell et al. | 380/25 |
| 5,838,790 A * | 11/1998 | McAuliffe et al. | 713/176 |
| 5,958,004 A * | 9/1999 | Helland et al. | 709/101 |
| 6,044,349 A | 3/2000 | Tolopka et al. | 705/1 |
| 6,049,832 A * | 4/2000 | Brim et al. | 709/237 |
| 6,161,185 A * | 12/2000 | Guthrie et al. | 713/201 |

* cited by examiner

*Primary Examiner*—Gilberto Barrón
*Assistant Examiner*—Grigory Gurshman
(74) *Attorney, Agent, or Firm*—Workman Nydegger

(57) ABSTRACT

Systems and methods for verifying the authorization of a server to provide network resources to a client. At selected times, the client asserts an authorization interrupt, which will disable some or all non-essential functions of the client unless the server's authorization is verified within an allotted period of time. The client creates a client message by generating a random number and combining it with a client identifier and a value that specifies the current time. The client message is encrypted and sent to the server. Only authorized servers can decrypt the client message and create an encrypted service message that includes the random number. The service message can also contain an authorization code specifying the services that the client may receive, and an expiration count indicating when the authorization procedure will be repeated. The client receives and decrypts the service message. If the random number in the service message is found to be the same as the random number in the client message, the server is authorized, and the client is enabled to exhibit a selected level of functionality. The client can be associated with a smart card or another intelligent peripheral that verifies the authorization of the server in behalf of the client.

20 Claims, 10 Drawing Sheets

VERIFICATION OF SERVER AUTHORIZATION TO PROVIDE NETWORK RESOURCES

RELATED APPLICATIONS

This application is a continuation of U.S. patent application Ser. No. 09/270,362, filed Mar. 16, 1991, entitled, "Verification of Server Authorization to Provide Network Resources," now U.S. Pat. No. 6,304,969, issued on Oct. 16, 2001, which is hereby incorporated by reference.

BACKGROUND OF THE INVENTION

1. The Field of the Invention

The present invention relates to systems and methods for verifying the authorization of a server to provide network resources to a client. More specifically, the present invention relates to systems and methods whereby the client compares a random number encrypted in a message sent to the server with a random number encrypted in a message sent to the client from the server, wherein the client determines that the server is authorized if the random numbers are the same.

2. The Prior State of the Art

During recent years, the use of computer networks to distribute information to users has increased dramatically. For example, the Internet is currently used for many purposes, including electronic commerce, delivery of news, entertainment, and education, to name just a few. Many Internet service providers ("ISPs") and content providers have found that accurate identification of users is necessary to support subscription services. When a client establishes communication with an ISP, the server at the ISP typically verifies that the client is recognized as one that has duly subscribed to the Internet service. Likewise, many World Wide Web ("Web") sites are available to users by subscription only. When a client attempts to access a subscription-based Web site, the client may be prompted to verify that it is authorized to receive content from the site.

Verification of the identity of clients has been accomplished in many ways. A simple example involves the client transmitting to the server a user name and a password that has been previously registered with the server. If the user name and password match a registered user name and password stored at the server, the client is allowed access to the network resources. More advanced security systems include, for example, transmitting a client machine identifier from the client to the server or other techniques whereby information associated with the client verifies the identity of the client.

Verifying the identity and authorization status of clients allows ISPs and content providers to collect subscription fees from users. Without a reliable system to verify authorization of clients, non-authorized users could access service, and legitimate users may have little incentive to pay for service.

There are some network configurations and business models that require security measures beyond the typical client-identification strategies described above. In some instances, it is desirable to identify the authorization of the server to provide network resources to the client. For a variety of reasons, suppliers or manufacturers of certain client systems may desire to allow only selected servers to provide network resources to their client systems. In one example, a provider of enhanced Internet, television, or other information or entertainment services may develop a client system specifically designed to receive its information or entertainment resources. In this example, the supplier of the client system can be seen primarily as the provider of the information or entertainment services, while the client system can be seen as a tool allowing users to gain access to the provider.

The traditional security strategy of providing user names, passwords, or other identifiers is inadequate when applied to the verification of authorization of a server to provide network resources. As can be easily understood, simple identifiers are not readily applicable to configurations where a single or a small number of servers provide service to a large number of clients. In particular, if a server were to widely distribute an identifier to multiple clients, an imposter server could easily intercept the identifier and attempt to adopt the identity of the authorized server.

In addition, the entity that desires to control access by unauthorized servers is often not the client, but is instead the operator of the authorized server. When an unauthorized server attempts to gain access to client systems, the operator of the authorized server may not be aware of the attempt. Accordingly, if conventional security systems were the only available means of protection, the client system and the operator of the unauthorized server could collude to override the security system. As a result, any security system that is freely accessible by the operators of client systems or unauthorized servers could be breached relatively easily.

In view of the foregoing, what is needed is a system for verifying the identity or authorization of servers to provide network resources to client systems. It would be an advancement in the art to provide a system for verifying the authorization of servers that is not merely analogous to the conventional use of identifiers to verify the identity of clients. It would be particularly advantageous to verify the authorization of servers using a security system that cannot be readily accessed or overridden by an operator of the client system. It would also be desirable to combine such a system for verifying the authorization of servers with a system for verifying the identity of clients.

SUMMARY AND OBJECTS OF THE INVENTION

The present invention relates to systems and methods for verifying the authorization of a server to provide network resources to a client. The authorization process requires the server to decrypt a message generated by the client and to respond with an appropriate encrypted message. Authorized servers have the decryption key needed to decrypt the message, whereas unauthorized servers will be unable to decrypt the message or to return the appropriate encrypted message to the client. The system can be configured to prevent software operating on the client from enabling the functions of the client without proper server authorization or may otherwise override the security features. In addition, the process of verifying the authorization of the server can be combined with measures to verify the identity of the client.

According to one implementation of the invention, when a security counter, or timer, exceeds the value of an expiration count stored at the client or at other selected times, an authorization interrupt is generated. The other selected times for generating authorization interrupts may occur, for example, when the client is turned on or when software operating at the client generates a reauthorization signal. The authorization interrupt eventually disables some or all of the functions of the client unless the server is authorized within an allotted period of time. In response to the authorization interrupt, the client generates a client message that includes the value of the security counter, a client identifier, and a random number. The client message is encrypted using an encryption key and is transmitted to the server.

If the client message is received by an unauthorized server, the server is unable to decrypt the message and to access the encoded information included therein. When the client message is instead received by an authorized server, the server uses a decryption key to decrypt the message. The server then decombines the value of the security counter, the client identifier, and the random number. Based on the value of the security counter, the server selects a new expiration count that will cause the client to again initiate the authorization process at a future time. The client identifier is compared against a client authorization database to determine the level of service that the client is authorized to receive. The level of service represents a level of functionality that the client is permitted to exhibit. The server generates an authorization code corresponding to the authorized level of service.

The server then creates a service message by combining the new expiration count, the authorization code, and the random number that was included in the client message. The server encrypts the service message and transmits it to the client. If the client message had been received by an unauthorized server, the message would have remained encrypted, such that the unauthorized server would not have gained access to the random number. Thus, any service message created by an unauthorized server will not include the original random number.

The client receives, decrypts, and decombines the service message. The random number included in the service message is compared with the random number included in the client message. If the random numbers are the same, the client assumes that the server is authorized to provide network resources. The new expiration count is written to an expiration count register and the new authorization code is written to an authorization register at the client. The client can then receive service from the server until the security count exceeds the new expiration count. If, however, the random numbers are not the same, the client assumes that the server is unauthorized, and the functions of the client are disabled according to the authorization interrupt after the allotted time has expired.

The client can include features that effectively prevent software executed on the client or the operator of the client from interfering with the server verification and authorization procedures of the invention. For example, the encryption key can be encoded on an integrated circuit at the client to prevent the key from becoming publicly known. Furthermore, the integrated circuit can have multiple encryption keys encoded thereon, with one of the keys being selected at random in each authorization procedure.

Certain registers at the client, such as those that specify the level of authorization of the client, can be controlled by the server without the intervention of software at the client. In particular, the server sends encrypted information to the client, where it can be decrypted by a decryption key encoded in an application-specific integrated circuit and then written to control registers. Thus, once the server verifies the identity of the client, the appropriate level of authorization can be maintained, even if the security of client software is breached. The authorized server, at its discretion, can also make any of a wide range of requests to the client to ensure that the client is authorized to receive network resources. For example, the client machine identifier can be independently verified by the server.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to systems and methods for verifying the authorization of a server to provide network resources to a client. Repeatedly, and at specified times, the client initiates communication with the server and transmits a first encrypted message to the server. An authorized server has access to a decryption key that is used to decrypt the first encrypted message. If, however, the server is unauthorized, the message cannot be decrypted. When the first encrypted message has been successfully decrypted, the authorized server generates a second encrypted message and transmits it to the client. Based on the contents of the second encrypted message, the client can determine whether the server is authorized to provide the network resources.

The invention is described below by using diagrams to illustrate either the structure or processing of embodiments used to implement the system and method of the present invention. Using the diagrams in this manner to present the invention should not be construed as limiting of its scope. The embodiments of the present invention may comprise a special purpose or general purpose computer including various computer hardware, as discussed in greater detail below. The embodiments may further comprise multiple computers linked in a network environment.

Embodiments within the scope of the present invention include computer readable media having computer-executable instructions or data structures stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired computer-executable instructions or data structures and which can accessed by a general purpose or special purpose computer. Combinations of the above should also be included within the scope of computer readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Figure 1:
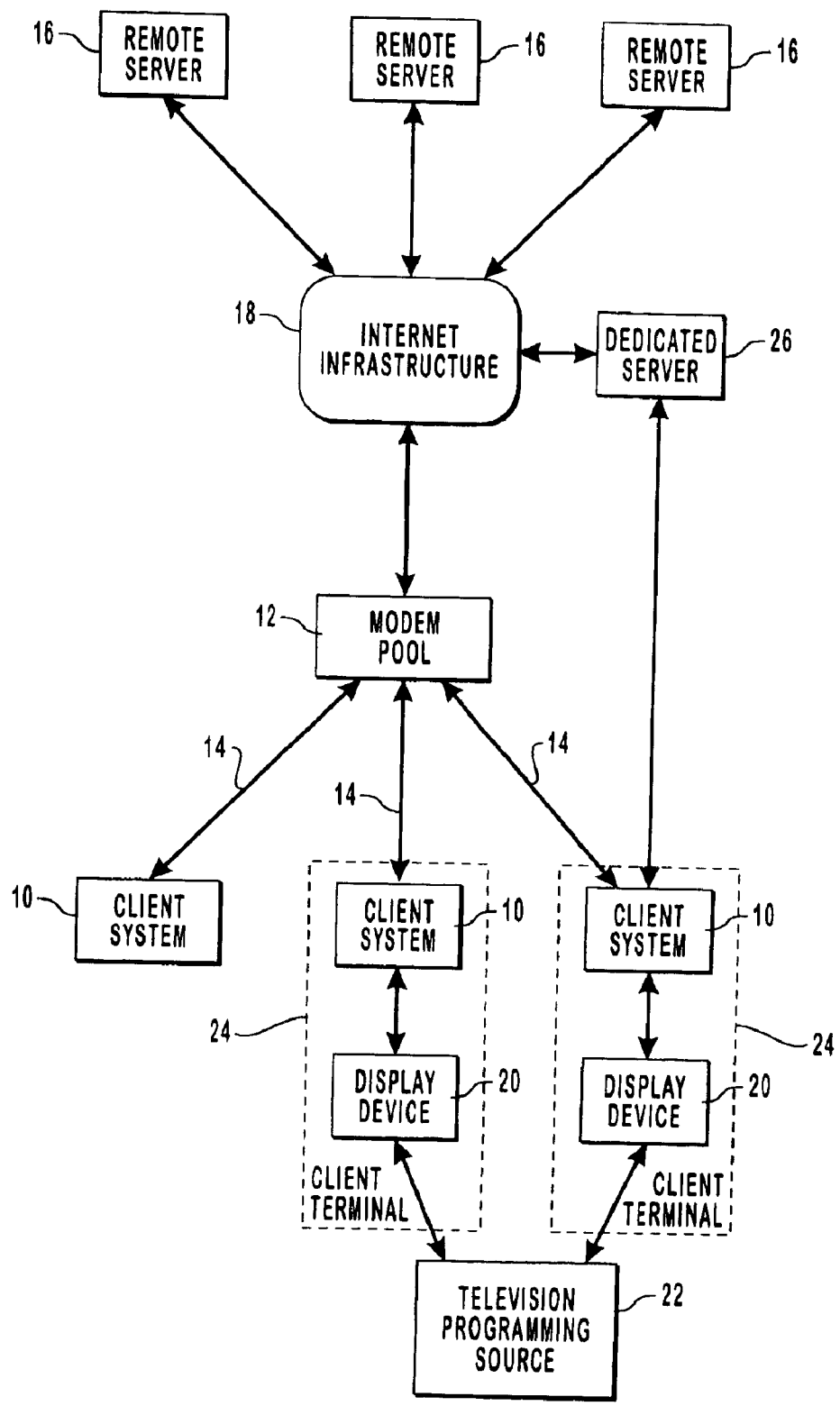
FIG. 1 is a schematic diagram illustrating a network environment in which the invention may be implemented.
Figure 2:
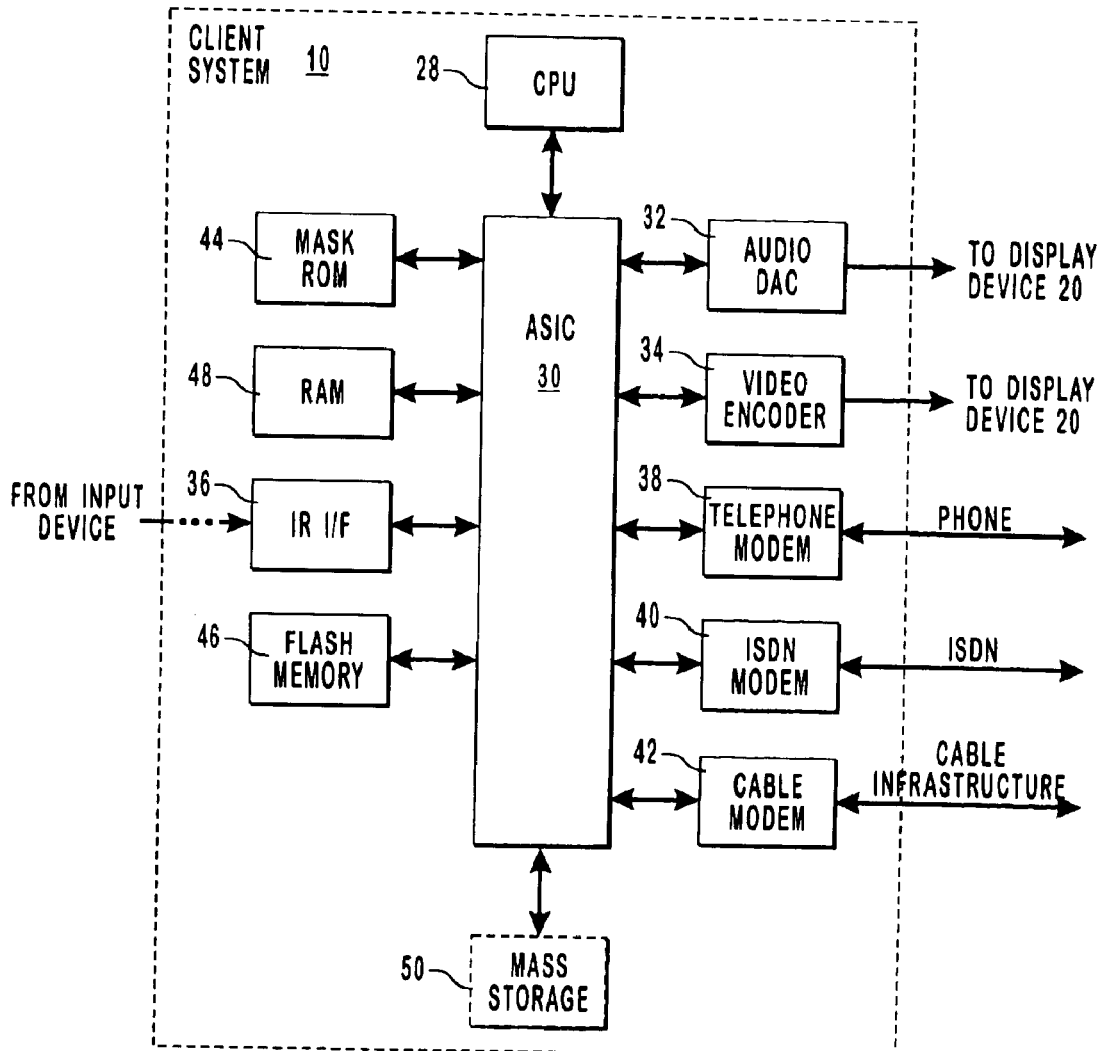
FIG. 2 is a schematic diagram illustrating one embodiment of a client system for use with the invention.

FIGS. 1 and 2 and the following discussion are intended to provide a brief, general description of a suitable network and computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types.

For illustration purposes, the invention is described herein in reference to the Internet, which represents one example of the network environments that are compatible with the invention. However, the principles disclosed herein are also applicable to substantially any other network environment in which a server provides network resources to a client. For example, a smart card or another PCMCIA device can be used as an intermediary device that communicates with the server and, in turn, with the client.

FIG. 1 illustrates one embodiment of the architecture of an network environment in which the invention may be implemented. In this embodiment, multiple client systems 10 communicate with a modem pool 12 by means of direct-dial, bi-directional data connections 14, which may be conventional telephone lines, ISDN connections, connections supported by cable television providers, or any other suitable communications channel. Modem pool 12 may be any conventional modem pool, such as those that are currently used for providing access to the Internet and other wide area networks. For example, modem pool 14 may be provided by a local ISP. Thus, modem pool 14 may be coupled to a number of server computers, such as remote servers 16, via a conventional network infrastructure, which may be Internet infrastructure 18.

The systems and methods of verifying the authorization of a server can be practiced in network environments that combine information retrieval over the Internet with television viewing. As seen in FIG. 1, at least some of client systems 10 can be associated with display devices 20 that serve a dual function. First, display devices 20 display graphical, computer-generated or computer-transmitted information provided by client systems 10. World Wide Web ("Web") pages retrieved from remote servers 16 represent one example of the graphical information that may be displayed on display devices 20. Second, television programming transmitted from television programming source 22 may also be displayed on display devices 20. Television programming source 22 may be any desired television broadcaster or delivery system. Accordingly, display device 20 may be a conventional television or may instead be a computer monitor adapted to display television programming. Indeed, the client system is optionally integrated in a television, or instead may be a self-contained unit. It is anticipated that, as high definition television ("HDTV") becomes common, embodiments of client terminal 26 will support HDTV. As used herein, "client terminal" 26 is defined to include a client system 10 and a display device 20.

Optionally, the system of FIG. 1 can include a dedicated server 26 that is dedicated to providing Internet access to some or all of client systems 10. In this example, dedicated server 26 differs from modem pool 12 in that the dedicated server is specifically designed to service a particular type of client system 10 in contrast to serving any personal computer or other computing device that can access the Internet. Furthermore, dedicated server 26 optionally provides additional information services, such as television listings, enhanced television services, video and graphics delivery, etc.

FIG. 2 depicts selected elements of one embodiment of a client system that may be used to implements portions of the invention. Client system 10 uses hardware and computer-executable instructions for providing the user with a graphical user interface, by which the user can access Internet resources, send and receive e-mail, and optionally receive other information services. Operation of client system 10 is controlled by a central processing unit (CPU) 28, which is coupled to an application-specific integrated circuit (ASIC) 30. CPU 28 executes computer-executable instructions designed to implement features of client system 10, including some of the steps of methods of the present invention. ASIC 30 contains circuitry which is used to implement certain functions of client system 10. For example, ASIC 30 may be coupled to an audio digital-to-analog converter 32 and to a video encoder 34, which provide audio and video output, respectively, to display device 20 of FIG. 1.

Client system 10 may further include an IR interface 36 for detecting infrared signals transmitted by a remote control input device, such as a hand-held device or a wireless keyboard. In response to the infrared signals, IR interface 36 provides corresponding electrical signals to ASIC 30. A standard telephone modem 38 and an ISDN modem 40 are coupled to ASIC 30 to provide connections to modem pool 12 and, via the Internet 18, to remote servers 16. While the client system illustrated in FIG. 2 includes both a telephone modem and an ISDN modem, either one of these devices is sufficient to support the communications of the client system. Furthermore, in other embodiments, modems 38 and 40 may be supplemented or replaced with cable modem 42 or another suitable communications device. In other environments, communication may instead be established using a token ring or Ethernet connection.

Also coupled to ASIC 30 are a mask read-only memory (ROM) 44, a flash memory 46, and a random access memory (RAM) 48. Mask ROM 44 is non-programmable and provides storage of computer-executable instructions and data structures. Flash memory 46 may be a conventional flash memory device that can be programmed and erased electronically. Flash memory 46 may store Internet browser software as well as data structures. In one embodiment, a mass storage device 50 coupled to ASIC 30 is included in client system 10. Mass storage device 50 may be used to supply computer-executable instructions and data structures to other components of the client system or to receive data downloaded over the network. Mass storage device 50 may include any suitable medium for storing computer-executable instructions, such as magnetic disks, optical disks, and the like.

Application software and associated operating system software are stored in flash memory 46, or instead may be stored in any other suitable memory device, such as mask ROM 44 or mass storage device 50. The computer-executable instructions that, according to one embodiment of the invention, are used to monitor television viewing habits of a user and to construct a user profile that forms at least part of the basis for selecting advertisements are executed by CPU 28. In particular, CPU 28 executes sequences of instructions contained in one or more of mask ROM 44, flash memory 46, and RAM 48 to perform certain steps of the present invention that will be more specifically disclosed hereinafter.

In one embodiment of the invention, client system 10 is a WebTV set-top box manufactured by WebTV Networks, Inc. of Mountain View, Calif. In this case, dedicated server 26 of FIG. 1 can be a WebTV server that provides Internet access and, optionally, additional content and information. Alternatively, however, client system 10 may be any of a variety of systems for receiving resources from a server.

Those skilled in the art will appreciate that the invention is not limited to the distributed computing environment and the client system illustrated in FIGS. 1 and 2. The invention may be practiced using other client system configurations, including personal computers, hand-held devices, multi-processor systems, microprocessor-based or programmable consumer electronics, network PCs, minicomputers, mainframe computers, and the like. In distributed computing environments, program modules may be located in both local and remote memory storage devices. Moreover, the authorization of servers to provide network resources can be verified in local area networks and wide area networks in addition to the network depicted in FIG. 1. For example, a smart card, a PCMCIA device, or another intelligent peripheral can be used with the client to verify that the server is authorized to provide network resources according to an alternative embodiment.

Figure 3:
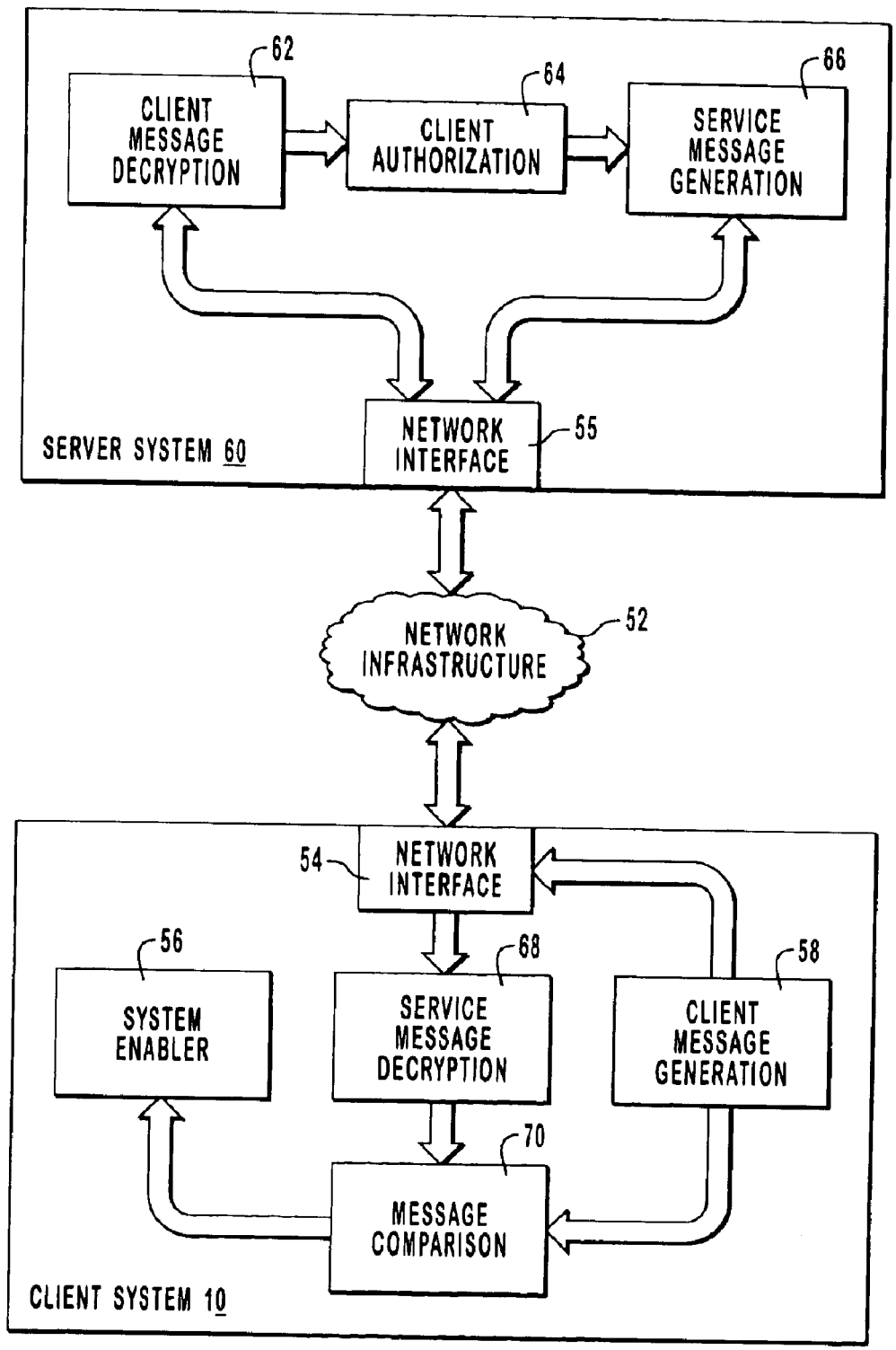
FIG. 3 is a schematic diagram depicting a client and a server interacting to verify the authorization of the server to provide network resources to the client.

FIG. 3 illustrates selected functional features of one embodiment of a system that includes a client system and a server system. Client system 10 communicates with a network infrastructure 52 via a conventional network interface 54, which may be any of the modems or other communications devices described above in reference to FIG. 2. Network infrastructure 52 may be the network architecture illustrated in FIG. 1. Client system 10 includes a system enabler module 56 that controls the availability of some or all of the non-essential features of client system 10. "Non-essential features", as used herein, can include all of the features of client system 10 other than the basic functions that permit the client system to verify the identity of server 60. For example, when all of the non-essential features of client system 10 are disabled, the client system may still be capable of being turned on and accessing server 60 sufficiently to determine whether the server is authorized to provide network resources, while being unable to retrieve and display information resources.

When client system 10 is periodically instructed to verify the authorization of server 60, client message generation module 58 creates an encrypted client message that is sent to the server via network infrastructure 52. In one embodiment, the encrypted client message includes a random number selected by client system 10. A detailed description of the components of the client message and the methods for creating the client message and generating random numbers is provided below in reference to FIG. 4.

Server system 60 of FIG. 3 is authorized to provide network resources to client system 10. Thus, server system 60 is capable of decrypting the client message using client message decryption module 62. Based on the information included in the client message, a client authorization module 64 determines the level of functionality that client system 10 is authorized to exhibit and determines the next time that the client system is to repeat the authorization process. The random number encoded in the client message and information specifying the client's authorized level of functionality and the next time that the client is to initiate reauthorization process are included in an encrypted service message created by service message generation module 66. It is noted that had server system 60 been not authorized to provide network resources to client system 10, it would have been incapable of decrypting the client message. Any random number included in the client message would have remained inaccessible by the unauthorized client, and any service message could not have included the random number.

Client system 10 receives the encrypted service message and decrypts it using service message decryption module 68. A message comparator module 70 compares the contents of the service message with the contents of the client message. In particular, in embodiments employing random numbers, message comparator module 70 determines whether the service message contains the same random number as the client message. If so, client system 10 assumes that server system 60 is authorized to provide network resources, and system enabler module 56 permits the authorized network resources to be received and displayed or otherwise communicated to a user of the client system. If, however, message comparator module 70 determines that the service message does not contain the same random number as the client message, client system 10 assumes that server system 60 is not authorized, and system enabler module 56 disables some or all of the non-essential functions of the client system.

Figure 4:
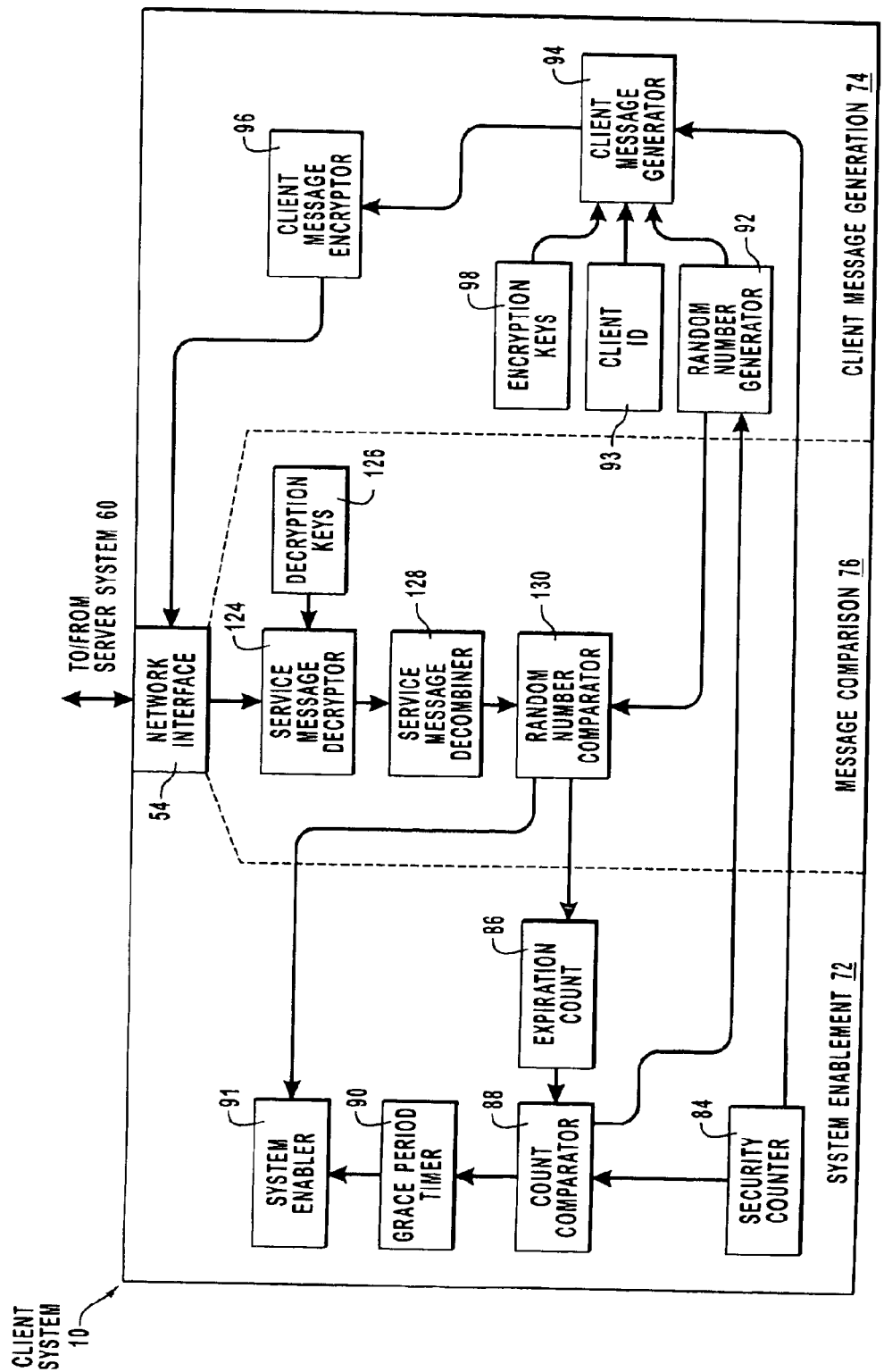
FIG. 4 is schematic diagram illustrating the client of FIG. 3 in greater detail, including features for generating an encrypted client message and for comparing a random number contained in a service message with a random number contained in the client message.
Figure 5:
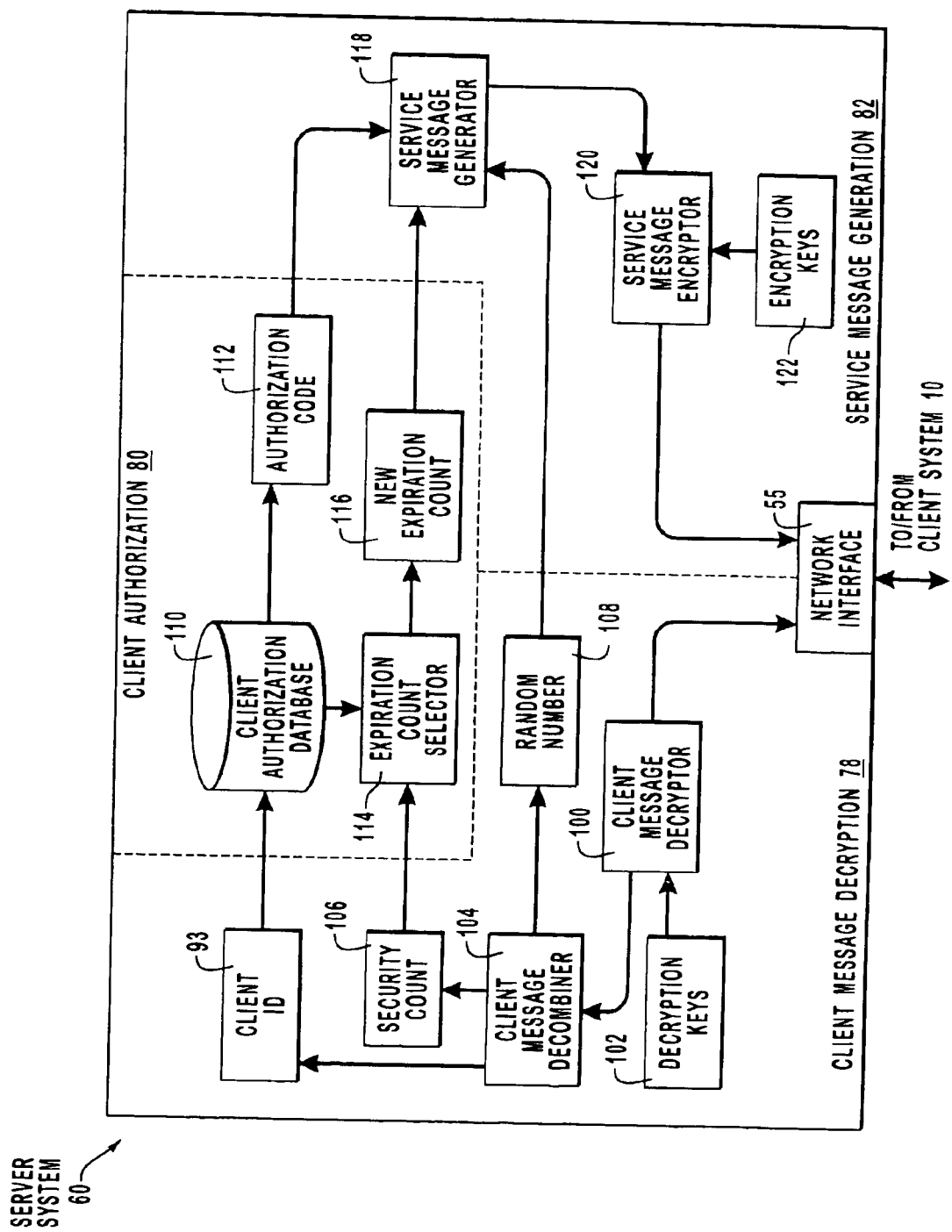
FIG. 5 is a schematic diagram illustrating the server of FIG. 3 in greater detail, including features for decrypting the client message and generating an encrypted service message.

FIGS. 4 and 5 illustrate in greater detail the elements and functions of the client systems and authorized server systems according to one embodiment of the invention. FIG. 4 depicts client system 10, which is illustrated as having three functional subsystems: system enablement subsystem 72, client message generation subsystem 74, and message comparison subsystem 76. Likewise, FIG. 5 depicts server system 60 as having three functional subsystems: client message decryption subsystem 78, client authorization subsystem 80, and service message generation subsystems 82. The foregoing subsystems are presented to conveniently describe the structure and functions of client system 10 and server system 60 in the following discussion. In particular, the subsystems of client system 10 and server system 60 will be addressed below in the order that they are used in a typical process of verifying the authorization of the server system according to the invention.

Turning to FIG. 4, client system 10 includes a security counter 84 and an expiration count 86 that together determine the moments at which the server verification procedures of the invention are initiated. Expiration count 86 has been set to specify when the server verification procedure is to begin. Security counter 84 is a timer or clock that repeatedly increments the value of a security count until the security count reaches or exceeds the value of expiration count 86. Count comparator 88 monitors security counter 84 and, when the security count reaches or exceeds expiration count 86, the count comparator asserts an authorization interrupt. Security counter 84 and count comparator 88 constitute one example of a timing mechanism for specifying the times at which the client is to assert an authorization interrupt. In response to the authorization interrupt, a grace period timer 90 counts down an allotted grace period. If client system 10 fails to verify the authorization of server system 60 to provide network resources before the expiration of the allotted grace period, system enabler 91 will disable some or all of the non-essential functions of the client system.

The authorization interrupt asserted by count comparator 88 initiates activity in client message generation subsystem 74. In other circumstances, authorization interrupts can be created upon turning on client system 10 or at other times specified by software operating on the client system. To begin the process of verifying the authorization of server system 60, random number generator 92 generates a random number. In a preferred embodiment, random number generator 92 generates a unique signature based on asynchronous or external input conditions. For example, random number generator 92 can be a linear feedback shift register ("LFSR") seeded by asynchronous input according to techniques that will be understood by those skilled in the art. While numbers generated by an LFSR or by other conventional devices are technically pseudorandom, for purposes of this disclosure they will be designated as random. Random numbers generated by LFSRs or by other comparable systems provide the advantage of essentially eliminating the opportunity for other computers to generate random numbers in lockstep with client system 10.

Client system 10 further includes a client identifier 93, which can be a unique number associated with the client system. Client message generator 94 combines client identifier 93, the random number, and the current value of the security count, which indicates the current time. The value of the security count is a time identifier which permits the server system, as further described below, to specify the times at which the client system is to repeat the procedure for verifying the authorization of the server system. The value of the security count gives the server system a reliable understanding of the current time as measured by the client system.

The resulting client message is encrypted by client message encryptor 96 using an encryption key 98. In one embodiment, encryption key 98 is encoded in an integrated circuit, such as ASIC 30 of FIG. 2. Encoding encryption key 98 in hardware as opposed to software greatly increases the difficulty of identifying the encryption key by those who might want to compromise the security of the system. In another embodiment, multiple encryption keys 98 can be encoded on the integrated circuit, further increasing the difficulty of learning the encryption key and determining which of the multiple keys is used in any specific instance. When multiple encryption keys are available, the particular key that is to be used can be selected in a random process. In addition, when there are multiple encryption keys 98, the encryption key that is used to encrypt a particular client message can be included in the client message for a purpose that is discussed below in reference to FIG. 5.

The encrypted client message is sent from client system 10 to server system 60 via network interface 54. Client message decryptor receives the client message through network interface 55 and decrypts it using the appropriate decryption key 102. When client system 10 includes only one encryption key 98, the selection of the decryption key 102 is relatively straightforward, since there will be only one decryption key.

However, when client system 10 includes multiple encryption keys 98, decryption may involve successively applying the corresponding decryption keys 102 to the client message in a trial and error process until one decryption key is found to successfully decrypt the message. Because the client message includes a random number, the security count, and the client identifier, a successful decryption can be determined when the decrypted client identifier matches one of the client identifiers registered at server system 60. It is noted that in some embodiments it may not be possible to reliably determine whether a message has been successfully decrypted by examining only the decrypted random number, and to a lesser degree, the security count, since the server system does not know what random number and security count to look for.

In some embodiments, there can be a very small risk that the client message decryptor 100 will apply one of the decryption keys 102 that does not correspond to the encryption key 98 used by client system 10, but will still determine that the decrypted client identifier matches one of the registered client identifiers. In other words, there can be a small possibility of a false positive decryption, in which the wrong decryption key will process the encrypted client identifier such that, by chance, it matches one of the registered client identifiers. If this were to occur, the random number would not be properly decrypted. Including the encryption key in the encrypted client message can eliminate this risk, however slight it might be. In particular, client message decryptor 100 can successively apply the multiple decryption keys 102 to the client message until the decrypted client message reveals an encryption key that corresponds to the decryption key just applied to the client message and a client identifier that matches a registered client identifier. Nonetheless, for most purposes, the invention can be practiced with negligible risk of a false positive decryption result without including the encryption key in the client message. Indeed, in many cases, the efficiency losses incurred by increasing the size of the client message could outweigh any benefits that might be realized by eliminating the risk of a false positive decryption result.

Once the client message has been successfully decrypted, the message is decombined, or separated into its constituent parts, by client message decombiner 104 using the inverse mathematical operation that has been used to combine these values at client system 10. Client identifier 93, security count 106, and random number 108 are thereby extracted from the client message. In embodiments that establish the authorization level by which client system 10 is to receive service in addition to verifying the authorization of server system 60 to provide service, client identifier 93 is compared against client authorization database 110, which contains records of the authorization levels of the registered clients. The appropriate authorization code 112 for client system 10 is derived from client authorization database 110.

Server system 60 can perform any additional security checks to verify the identity of client system 10. For example, server system 60 can request that client system 10 securely transmit its client identifier 93 to compare it against the client identifier included in the client message. Those skilled in the art will recognize that other information can be transmitted from client system 10 to server system 60 in order to verify the validity of the client message.

Based on the value of security count 106, which specifies the time that the current authorization interrupt has been asserted, as measured by the client system, an expiration count selector 114 selects a new expiration count 116. New expiration count 116 can be selected based on the particular user profile associated with client system 10 as defined in client authorization database 100, or can instead be selected to cause the reauthorization procedure to be repeated after a standard period of time.

A service message generator 118 then mathematically combines random number 108, authorization code 112, and new expiration count 116 to generate a service message. Since authorized server system 60 has successfully decrypted the client message, the service message generated thereby includes the same random number as the client message. The service message is encrypted by service message encryptor 120 using an encryption key 122. The resulting encrypted service message is transmitted to client system 10 via network interface 55.

Reference is now made to FIG. 4, which illustrates elements of message comparison subsystem 76 according to this embodiment of the invention. The service message is received by a service message decryptor 124, which decrypts the message using a decryption key 126. A service message decombiner separates the service message into its constituent parts, which include the authorization code, the new expiration count, and the random number. The random number included in the service message is passed to random number comparator 130, where it compared with the random number included in the client message. If it is determined that the random numbers are the same, client system 10 assumes that server system 60 has decrypted the message and is therefore authorized to provide network resources to the client. If, however, client system 10 receives no service message or does not receive the original random number in the service message, the client system assumes that the server system is unauthorized.

If the server system is found to be authorized, client system enables or activates its functions based on the value of the authorization code. An appropriate authorization code written to a control register in an application-specific integrated circuit, such as ASIC 30 of FIG. 2, permits the functions of the client system to operate. The authorization code can further indicate one of any number of levels of service or functionality. For example, when the invention is practiced in a WebTV set-top box or another client system that provides information and entertainment services to a user, the authorization code may activate the particular services that the user has subscribed to. Likewise, the new expiration count is written to a control register at the client system so as to again initiate the server verification procedure described herein when the security count exceeds the new expiration count.

If the server system has been determined to be unauthorized, grace period timer 90 of FIG. 4 will eventually indicate that the allotted grace period has expired. At this point, the non-essential or any other set of functions of client system 10 are disabled until such time that an authorized server system is identified.

Figure 6:
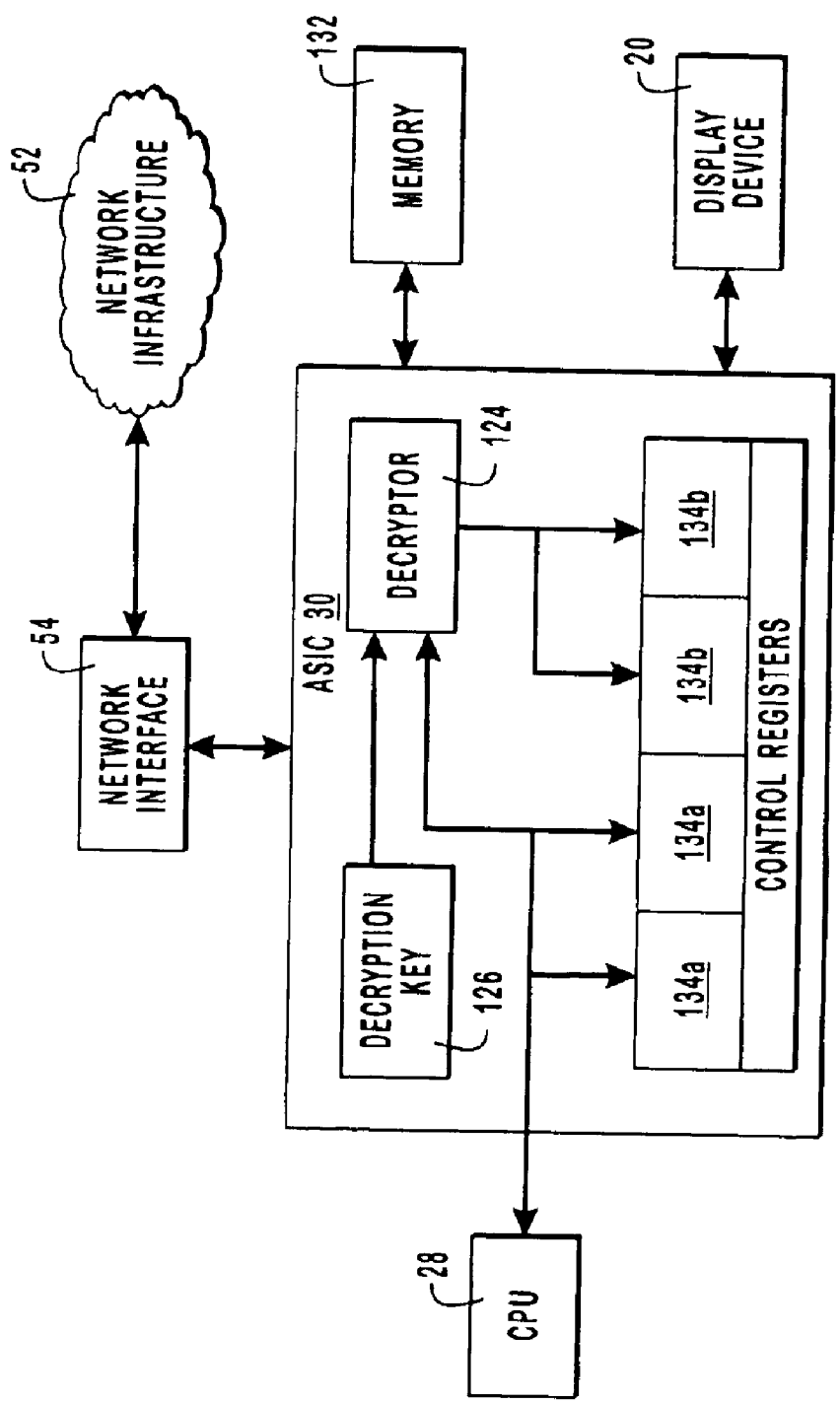
FIG. 6 is a schematic diagram showing the manner in which an application-specific integrated circuit at the client can decrypt authorization information received from the server using an encoded decryption key according to one embodiment of the invention.

FIG. 6 illustrates an embodiment of the invention wherein the authorization code and the new expiration count are written to control registers at an ASIC in a secure manner that essentially eliminates the opportunity of operators of the client system to override or otherwise tamper with the security features described herein. As has been described in reference to FIG. 2, ASIC 30 is connected to a display device 20 and one or more memory devices 132. ASIC 30 can receive service messages and other information from the server system by means of network infrastructure 52 and network interface 54.

One of the functions of CPU 28 is writing control parameters to control registers 134 of ASIC 30. Among the control parameters are the authorization code and the new expiration count. According to this embodiment, CPU 28 transmits the authorization code and the new expiration count to ASIC 30 in the encrypted form in which they were received from the server system. A private decryption key 126 is encoded on ASIC 30 and permits a decryptor 124 encoded on ASIC to perform decryption of the authorization code and the new expiration count. It is noted that decryption key 126 and decryptor 124 of FIG. 6 can be the same as the corresponding elements illustrated in FIG. 5. Once the client system determines that the server system authorized, the new expiration count and the authorization code, having been decrypted, are written to secure registers 134b. In this manner, authorized server system 60 can securely write the new expiration count, the authorization code, and any other security parameters to secure control registers 134b without software operating on the client system having access to decryption key 126. Control parameters that do not pertain to the security features of the invention can be written to non-secure control registers 132a included in ASIC 30.

As illustrated in FIG. 6, the security system of the invention can allow operating system software or other software operating on the client system to see only a limited amount of information. For example, as discussed herein, the authorization code and the expiration count can be written to secure control registers 134b. In addition, the authorization interrupt signal generated by count comparator 88 of FIG. 4 can be written to a control register 132 in one embodiment. Otherwise, the operation of the security system of this embodiment of the invention is not visible to the operating system, but is instead conducted by transmitting encrypted messages between the client system and the server system and decrypting the service message using a decryption key 126 encoded in hardware at the client system. Accordingly, rogue software or operators of the client system are unable to interfere with the operation of the security features of the invention.

Figure 7:
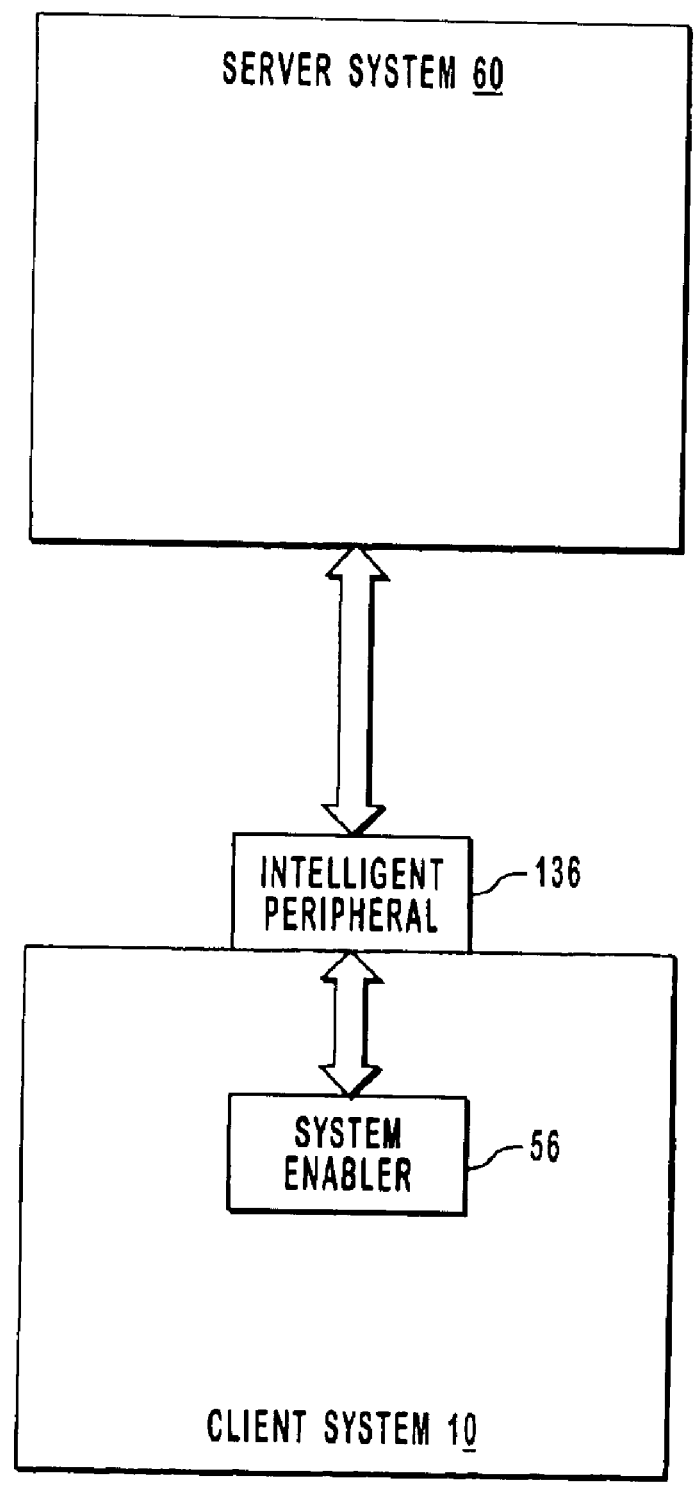
FIG. 7 is a schematic diagram illustrating an alternative embodiment in which a smart card is used in conjunction with the client to verify that the server is authorized to provide network resources.

FIG. 7 illustrates an alternative embodiment, wherein the communication between the client and server is facilitated by an intelligent peripheral. As used herein, "intelligent peripheral" refers to any object or device associated with the client system, whether embodied in hardware, software, or a combination of thereof, that is capable of verifying the authorization of a server to provide resources to the client. Examples of intelligent peripherals include smart cards or PCMCIA devices.

Intelligent peripheral 136 of FIG. 7 communicates with server system 60 and verifies the authorization of the server system to provide network resources to client system 10 in much the same way that the client system performed these functions in the embodiment disclosed above in reference to FIGS. 3–6. In effect, intelligent peripheral 136 is an intermediary device that performs the function of verifying the authorization status of server system 60 on behalf of client system 10. Thus, intelligent peripheral 136 can include the functional components to perform the verification that are otherwise described herein as being included in client system 10.

After intelligent peripheral 136 determines that server system 60 is authorized (or not authorized) to provide resources to client system 10, the client system communicates with the intelligent peripheral. The communication between client system 10 and intelligent peripheral 136 informs the client system whether server system 60 is authorized, and further can include verification of the credentials of the intelligent peripheral, itself. Thus, intelligent peripheral 136 can have the functional components to communicate with client system 10, to verify its own authorization, and to verify the authorization of server system 60 that are otherwise described herein as being included in the server system. System enabler module 56 responds to confirmation that server system 60 is authorized by enabling selected functions of client system 10 in a similar manner as described herein in reference to FIGS. 3–6.

The use of intelligent peripheral 136 can be useful when server system 60 is not immediately accessible, or when client system 10 and server system 60 are not simultaneously available to communicate directly one with another. Intelligent peripheral 136 can be constructed to prevent encryption keys or other sensitive information contained therein from being accessible to persons who might attempt to disassemble the intelligent peripheral and decode the sensitive information. Those skilled in the art, upon learning of the disclosure made herein, will understand how intelligent peripheral 136 can be constructed to prevent unauthorized access of information.

It is noted that intelligent peripheral 136 can be described as being a component of client system 10. Thus, unless otherwise indicated, any description or claim directed to a client system that verifies the authorization of a server system to provide resources encompasses the embodiment wherein an intelligent peripheral included in the client system performs some or all of the communication with the server system.

Figure 8:
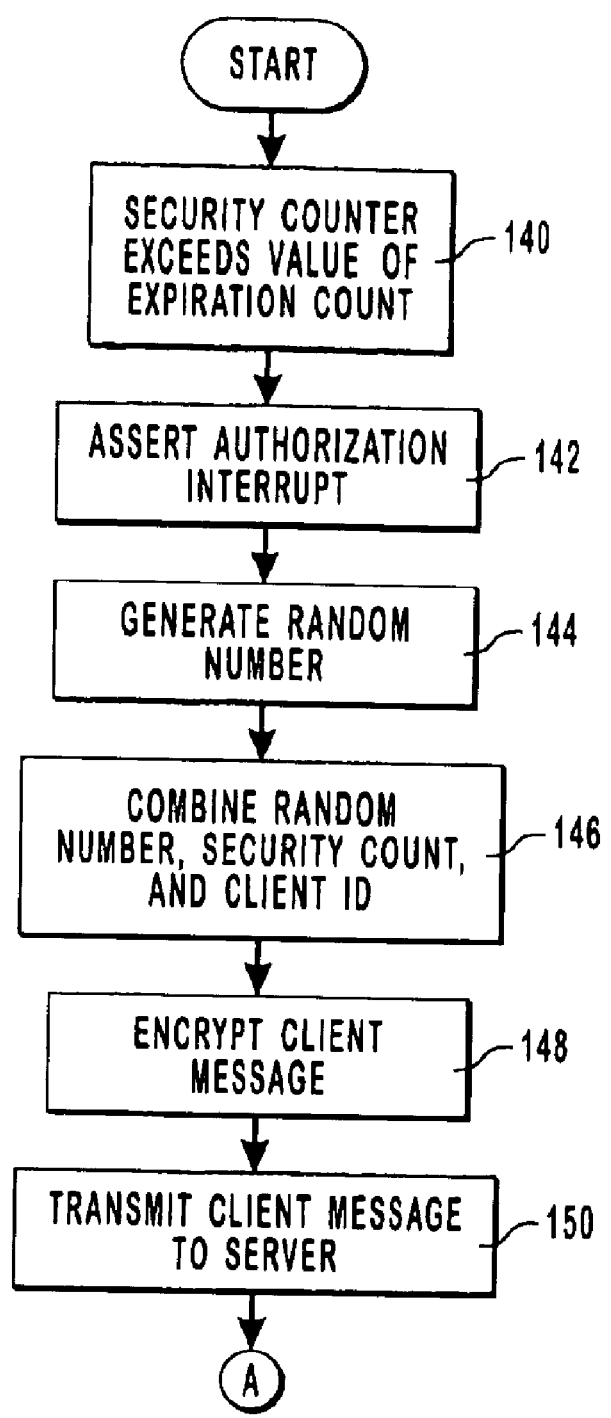
FIG. 8 is a flow diagram depicting a method for generating an encrypted client message that includes a random number.
Figure 9:
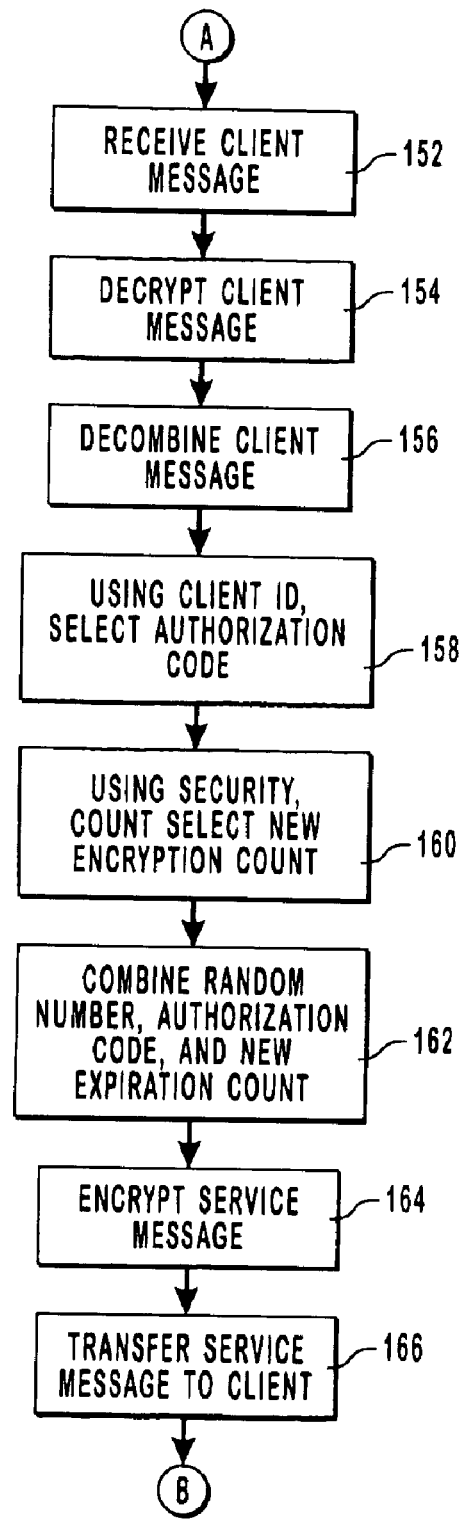
FIG. 9 is a flow diagram illustrating a method for decrypting the client message at the authorized server and generating an encrypted service message that incorporates the random number.
Figure 10:
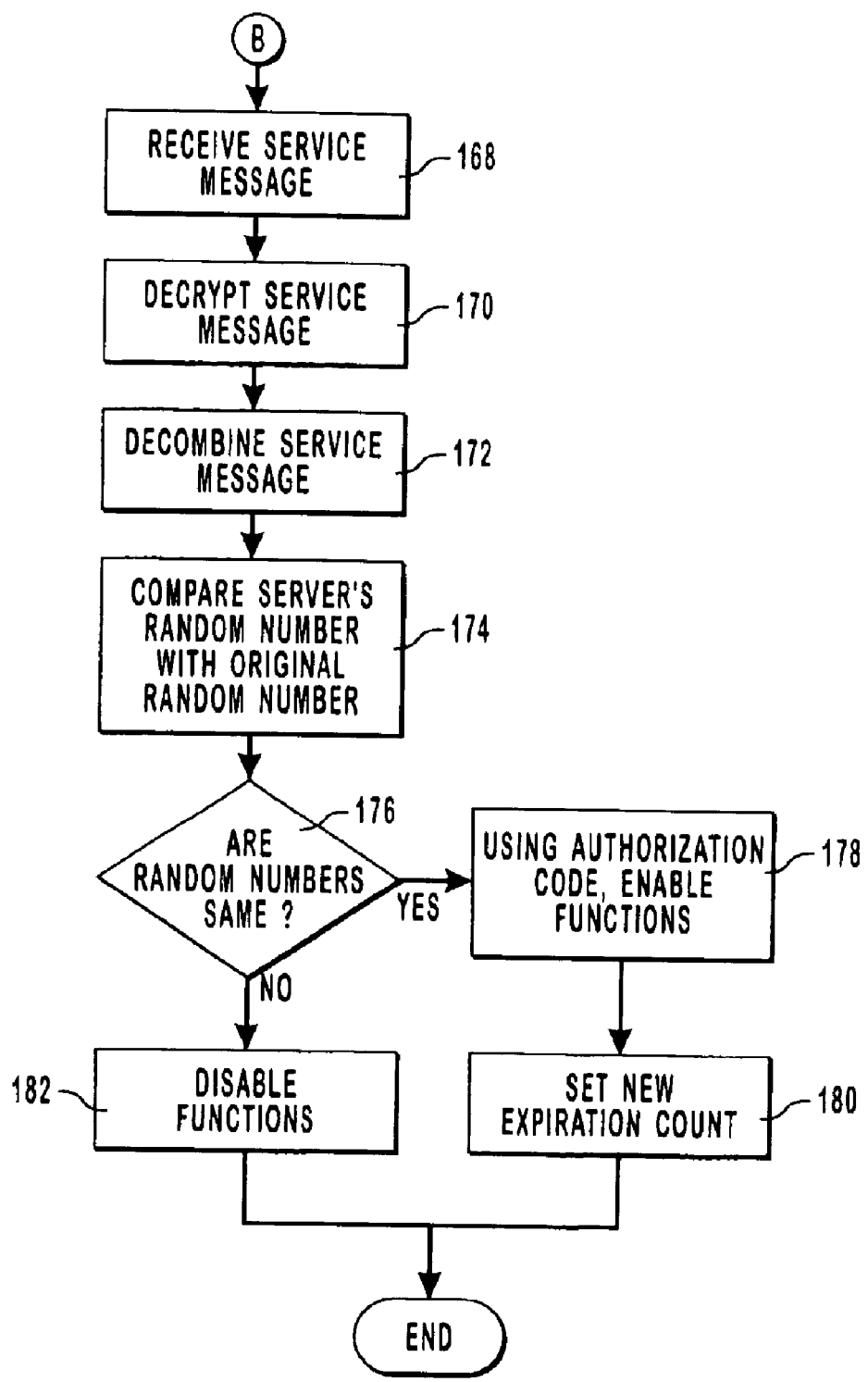
FIG. 10 is a flow diagram illustrating a method for decrypting the service message and comparing the random number included in the service message with the random number included in the client message.

FIGS. 8–10 summarize the steps of one embodiment of the methods for verifying that a server system is authorized to provide network resources to a client system. FIG. 8 illustrates a method for composing a client message in response to an authorization interrupt. FIG. 9 shows a method whereby an authorized server system receives the client message and composes a corresponding service message. FIG. 10 illustrates a method for comparing the contents of the service message with the contents of the client message.

In step 140 of FIG. 8, the security counter at the client system increments a security count until it reaches or exceeds the value of the expiration count. In step 142, the client system asserts an authorization interrupt, which will disable some or all non-essential functions of the client system after expiration of a grace period, unless the authorization of the server system is first verified. A random number is then generated in step 144 according to the techniques described herein. The client system combines the random number, the security count, and the client identifier to form a client message in step 146. In step 148, the client message is encrypted as described herein. As shown at step 150, the encrypted message is then transmitted to the server system.

Referring to FIG. 9, the server system receives the client message in step 152. The server system then decrypts the client message in step 154 and decombines the client message in step 156 as disclosed herein. Using the client identifier, the server system selects an authorization code to be associated with the client system as shown at step 158. The server system also selects a new expiration count in step 160, thereby indicating when the next reauthorization procedure should be initiated. In step 162, the server system combines the random number, the authorization code, and the new expiration count to form a service message. The service message is then encrypted in step 164 and transmitted to the client system in step 166.

As illustrated in FIG. 10, the client system receives the service message according to step 168. The client system then decrypts the service message in step 170 and decombines the service message in step 172. As shown at step 174, the client system compares the random number contained in the service message with the original random number contained in the client message. According to decision block 176, if the random numbers are the same, the authorization of the server system to provide network resources to the client system has been verified, and the method advances to step 178, in which the authorization code causes selected functions of the client system to be enabled, whereby selected resources from the server can be received by the client. Next, in step 180, the new expiration count is set, and will cause the method of FIGS. 8–10 to repeat when the security count again exceeds the expiration count.

If the server system had been unauthorized, any service message generated thereby would not have included the random number. In this case, decision block 176 would be answered in the negative, and the method would advance to step 182. In step 182, some or all of the non-essential functions of the client system would be disabled when the grace period expires without verification of the authorization of the server system, thereby preventing the client from receiving selected resources from the server.

The present invention may be embodied in other specific forms without departing from its spirit or other essential characteristics. The described embodiments are to be considered in all respects only as illustrative and not restrictive. The scope of the invention is, therefore, indicated by the appended claims rather than by the foregoing description. All changes which come within the range of equivalency of the claims are to be embraced within their scope.

What is claimed and desired to be secured by United States Letters Patent is:

1. A method of verifying that a server is authorized to provide resources to a client, the method comprising acts of:

generating a server authentication request at the client to verify that the server is authorized to provide at least one resource to the client;

transmitting the server authentication request to the server;

receiving an encrypted server authentication response from the server;

decrypting the server authentication response without user interaction in order to prevent a user from colluding with an unauthorized server to circumvent server authentication; and disabling one or more client functions unless the decrypted server authentication response indicates that the server is authorized to provide the at least one resource to the client.

2. A method as recited in claim 1, further comprising an act of activating one or more functions of the client if the server authentication response indicates that the server is authorized to provide at least one resource to the client.

3. A method as recited in claim 1, further comprising an act of waiting to disable the one or more functions until after a grace period.

4. A method as recited in claim 1, wherein the server authentication response indicates that the server is authorized to provide the at least one resource to the client, the method further comprising acts of:
  while the server is authorized to provide the at least one resource to the client, periodically:
    generating one or more subsequent server authentication requests at a client;
    transmitting the one or more subsequent server authentication requests to the server;
    for each of the one or more subsequent server authentication requests, receiving a subsequent encrypted server authentication response;
    decrypting each subsequent server authentication response; and
    for each of the one or more subsequent server authentication responses, disabling one or more client functions when a response fails to indicate that the server is authorized to provide the at least one resource to the client.

5. A method as recited in claim 4, wherein at least one server authentication response comprises expiration information, the method further comprising an act of determining when at least one subsequent authentication request should occur based on the expiration information.

6. A method as recited in claim 1, wherein the server authentication request comprises an encryption key and a random number, the method further comprising an act of encrypting the server authentication request.

7. A method of verifying that a server is authorized to provide resources to a client, the method comprising acts of:
  generating a server authentication request at the client, the server authentication request being encrypted with one or more encryption keys such that only an authorized server is able to decrypt the server authentication request;
  transmitting the server authentication request to the server;
  determining that no response to the server authentication request has been received by the client after an allotted period of time;
  interpreting no response as an indication that the server is not authorized to provide resources to the client; and
  disabling one or more client functions.

8. A method as recited in claim 7, further comprising an act of waiting to disable the one or more functions until after a grace period.

9. A method as recited in claim 7, further comprising acts of periodically:
  generating one or more subsequent server authentication requests at a client;
  transmitting the one or more subsequent server authentication requests to one or more subsequent servers;
  for each of the one or more subsequent server authentication requests, receiving a subsequent encrypted server authentication response;
  decrypting each subsequent server authentication response; and
  for each of the one or more subsequent server authentication responses:
    disabling one or more client functions when a response fails to indicate that a subsequent server is authorized to provide at least one resources to the client; and
    activating one or more client functions when a response indicates that the server is authorized to provide at least one resource to the client.

10. A method as recited in claim 9, wherein at least one server authentication comprises expiration information, the method further comprising an ac of determining when at least one subsequent authentication request should occur based on the expiration information.

11. A computer program product for implementing a method of verifying that a server is authorized to provide resources to a client, the computer program product comprising a computer readable medium carrying computer executable instructions that implement the method, wherein the method comprises acts of:
  generating a server authentication request at the client to verify that the server is authorized to provide at least one resource to the client;
  transmitting the server authentication request to the server;
  receiving an encrypted server authentication response from the server;
  using a decryption key encoded in hardware at the client system to decrypt the server authentication response in order to prevent rogue software or operators of the client system from colluding with the server to circumvent server authentication; and
  disabling one or more client functions unless the decrypted server authentication response indicates that the server is authorized to provide the at least one resource to the client.

12. A computer program product as recited in claim 11, the method further comprising an act of activating one or more functions of the client if the server authentication response indicates that the server is authorized to provide at least one resources to the client.

13. A computer program product as recited in claim 11, the method further comprising an act of waiting to disable the one or more functions until after a grace period.

14. A computer program product as recited in claim 11, wherein the server authentication response indicates that the server is authorized to provide the at least one resource to the client, the method further comprising acts of:
  while the server is authorized to provide the at least one resource to the client, periodically:
    generating one or more subsequent server authentication requests at a client;
    transmitting the one or more subsequent server authentication requests to the server;
    for each of the one or more subsequent server authentication requests, receiving a subsequent encrypted server authentication response;
    decrypting each subsequent server authentication response; and
    for each of the one or more subsequent server authentication responses, disabling one or more client functions when a response fails to indicate that the server is authorized to provide the at least one resource to the client.

15. A computer program product as recited in claim 14, wherein at least one server authentication response comprises expiration information, the method further comprising an act of determining when at least one subsequent authentication request should occur based on the expiration information.

16. A computer program product as recited in claim 11, wherein the server authentication request comprises an encryption key and a random number, the method further comprising an act of encrypting the server authentication request.

17. A computer program product for implementing a method of verifying that a server is authorized to provide resources to a client, the computer program product comprising a computer readable medium carrying computer executable instructions that implement the method, wherein the method comprises acts of:

generating a server authentication request at the client;

transmitting the server authentication request to the server;

determining that no response to the server authentication request has been received by the client after an allotted period of time;

interpreting no response as an indication that the server is not authorized to provide resources to the client; and disabling one or more client functions.

18. A computer program product as recited in claim 17, the method further comprising an act of waiting to disable the one or more functions until after a grace period.

19. A computer program product as recited in claim 17, the method further comprising acts of periodically:

generating one or more subsequent server authentication requests at a client;

transmitting the one or more subsequent server authentication requests to one or more subsequent servers;

for each of the one or more subsequent server authentication requests, receiving a subsequent encrypted server authentication response;

decrypting each subsequent server authentication response; and for each of the one or more subsequent server authentication responses:

disabling one or more client functions when a response fails to indicate that a subsequent server is authorized to provide at least one resource to the client; and activating one or more client functions when a response indicates that the server is authorized to provide at least one resource to the client.

20. A computer program product as recited in claim 19, wherein at least one server authentication response comprises expiration information, the method further comprising an act of determining when at least one subsequent authentication request should occur on the expiration information.

* * * * *

UNITED STATES PATENT AND TRADEMARK OFFICE
CERTIFICATE OF CORRECTION

PATENT NO. : 6,910,136 B1
APPLICATION NO. : 09/978536
DATED : June 21, 2005
INVENTOR(S) : Wasserman et al.

It is certified that error appears in the above-identified patent and that said Letters Patent is hereby corrected as shown below:

In column 1, line 8, delete "1991" and insert -- 1999 --, therefor.

In column 16, line 2, in Claim 10, after "authentication" insert -- response --.

In column 16, line 3, in Claim 10, delete "ac" and insert -- act --, therefor.

In column 18, line 21, in Claim 20, after "occur" insert -- based --.

Signed and Sealed this

Twenty-first Day of July, 2009

JOHN DOLL
*Acting Director of the United States Patent and Trademark Office*